United States Patent [19]

Douglas et al.

[11] 4,229,991
[45] Oct. 28, 1980

[54] GEAR REDUCER WITH TANDEM DRIVES TO THE OUTPUT

[75] Inventors: Walter H. Douglas, Centerville, Ohio; Richard F. Peterson, Traverse City, Mich.; Willard J. Nielsen, Traverse City, Mich.; Charles D. Treat, Traverse City, Mich.; Jerry B. Hagaman, Traverse City, Mich.; Wendell G. Loveless, Traverse City, Mich.; William R. Scott, Rapid City, Mich.

[73] Assignee: Ex-Cell-O Corporation, Troy, Mich.

[21] Appl. No.: 890,355

[22] Filed: Mar. 27, 1978

[51] Int. Cl.² .................. F16H 55/18; F16H 57/00; F16H 37/06
[52] U.S. Cl. .................................. 74/409; 74/410; 74/665 R; 74/665 G; 74/665 P
[58] Field of Search ............. 74/665 P, 665 R, 665 G, 74/409, 410

[56] References Cited

U.S. PATENT DOCUMENTS

| | | | |
|---|---|---|---|
| 1,499,617 | 7/1924 | Kasley | 74/410 |
| 2,014,138 | 9/1935 | Kuhns et al. | 74/410 |
| 3,338,109 | 8/1967 | Forsyth et al. | 74/410 |
| 4,044,632 | 8/1977 | Wildhaber | 74/665 G |

*Primary Examiner*—Leslie Braun
*Attorney, Agent, or Firm*—Mitchell J. Hill; James H. Bower

[57] ABSTRACT

A cone drive, high output speed reducer, having a low clearance for low profile applications. An input shaft drives a helical idler pinion which in turn drives two other helical idler pinions. The two other idler pinions are each mounted on a separate shaft carrying a cone drive worm. The two worm shafts turn in unison, and the worms are each meshed with a separate worm gear. The two worm gears are operatively mounted on an output shaft. One of the helical idler pinions is provided with an adjustment means for equalizing the load sharing. That is, to provide equal loads on each of the helical pinions for load sharing throughout the twin drive gearing units of the speed reducer. The speed reducer may be provided with either an air cooling system or a water cooling system.

6 Claims, 9 Drawing Figures

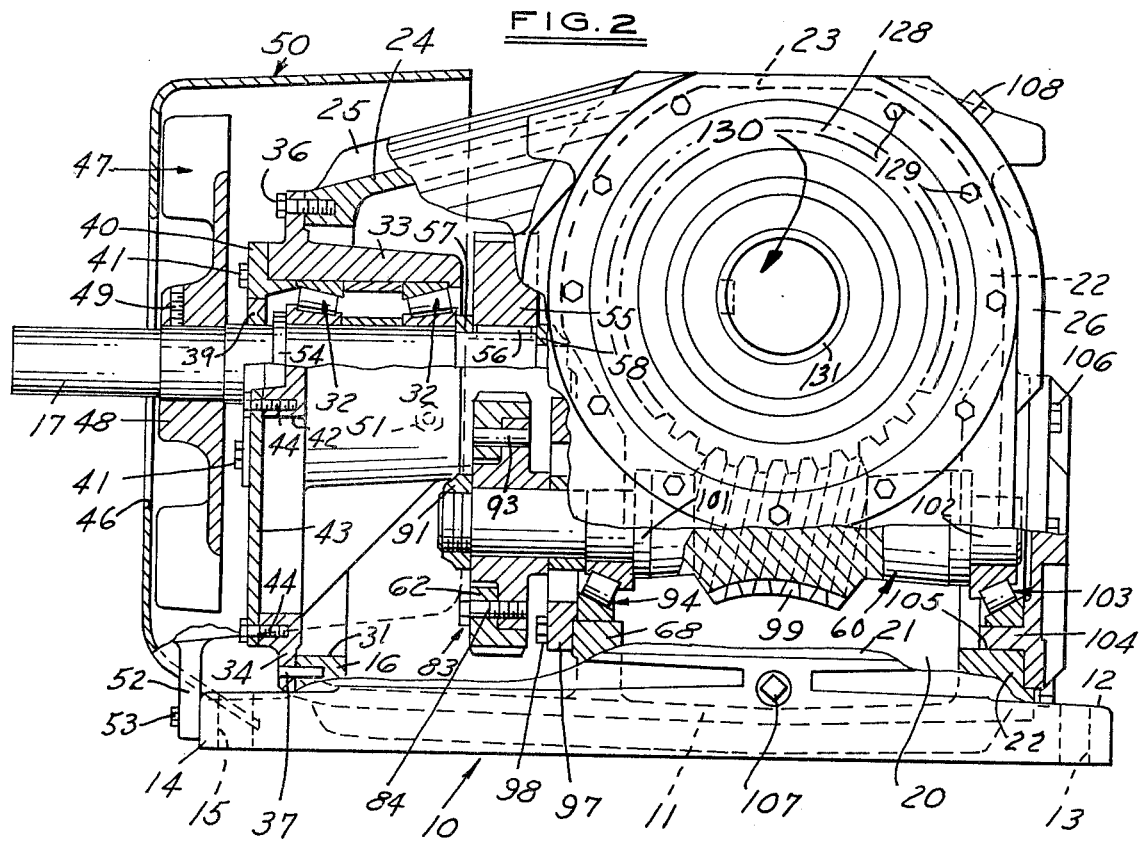
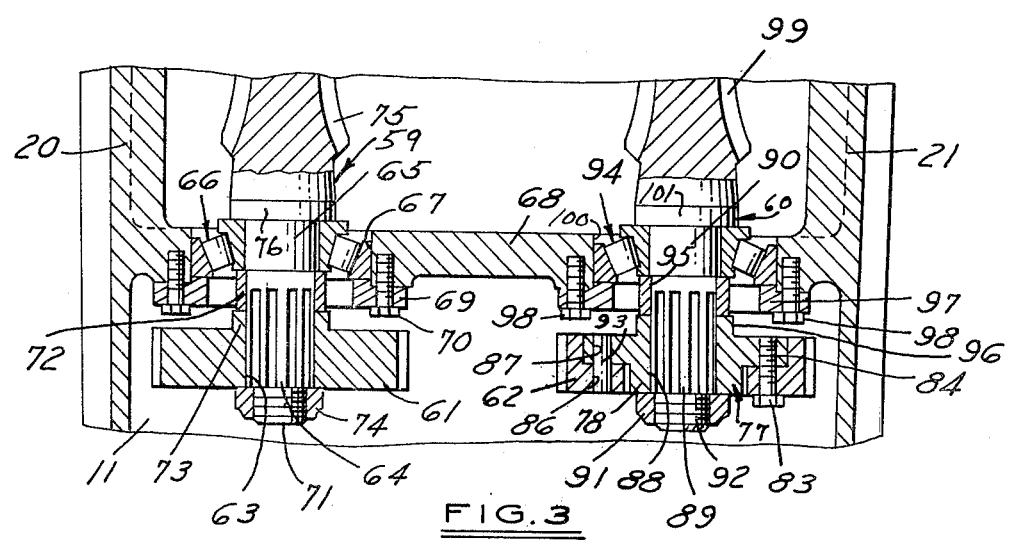

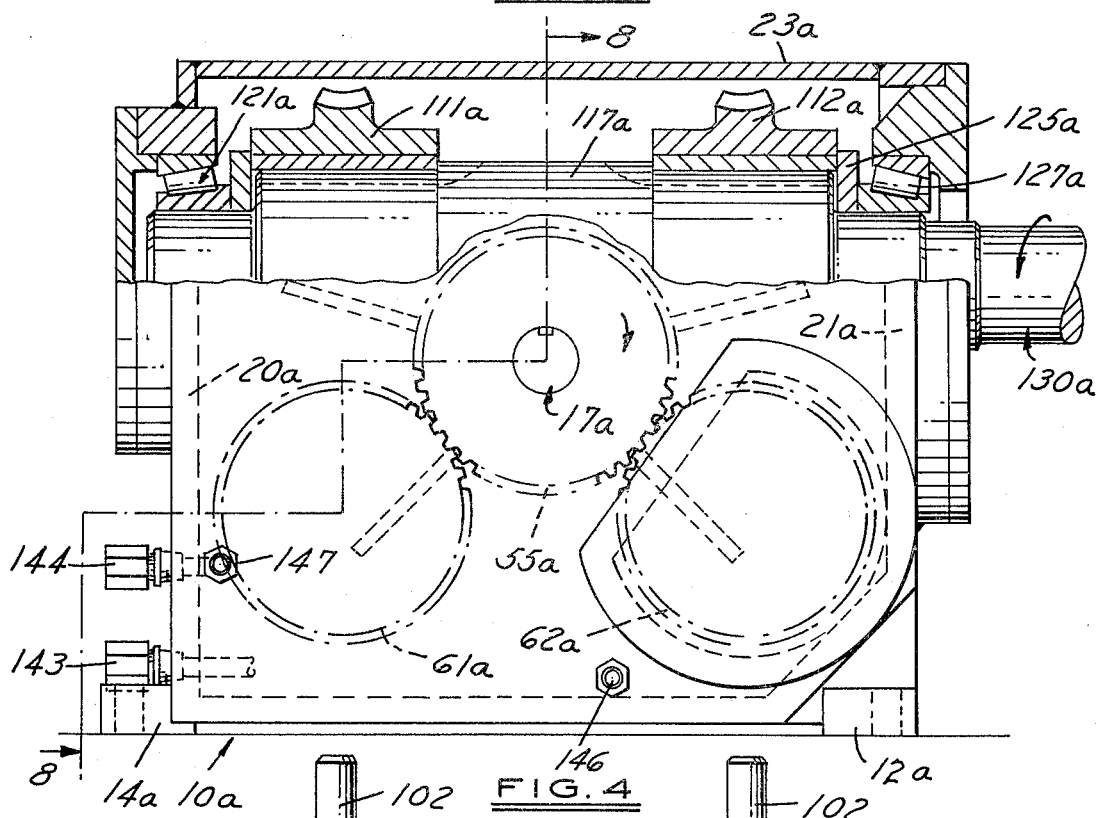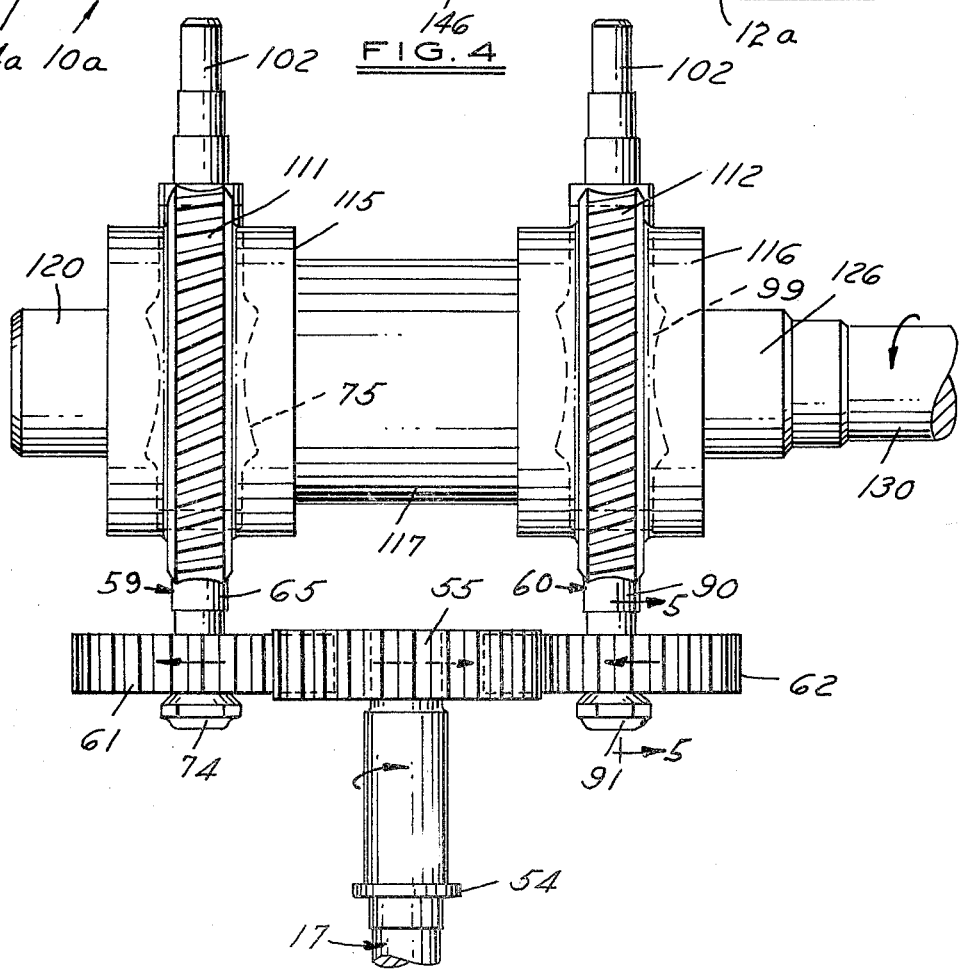

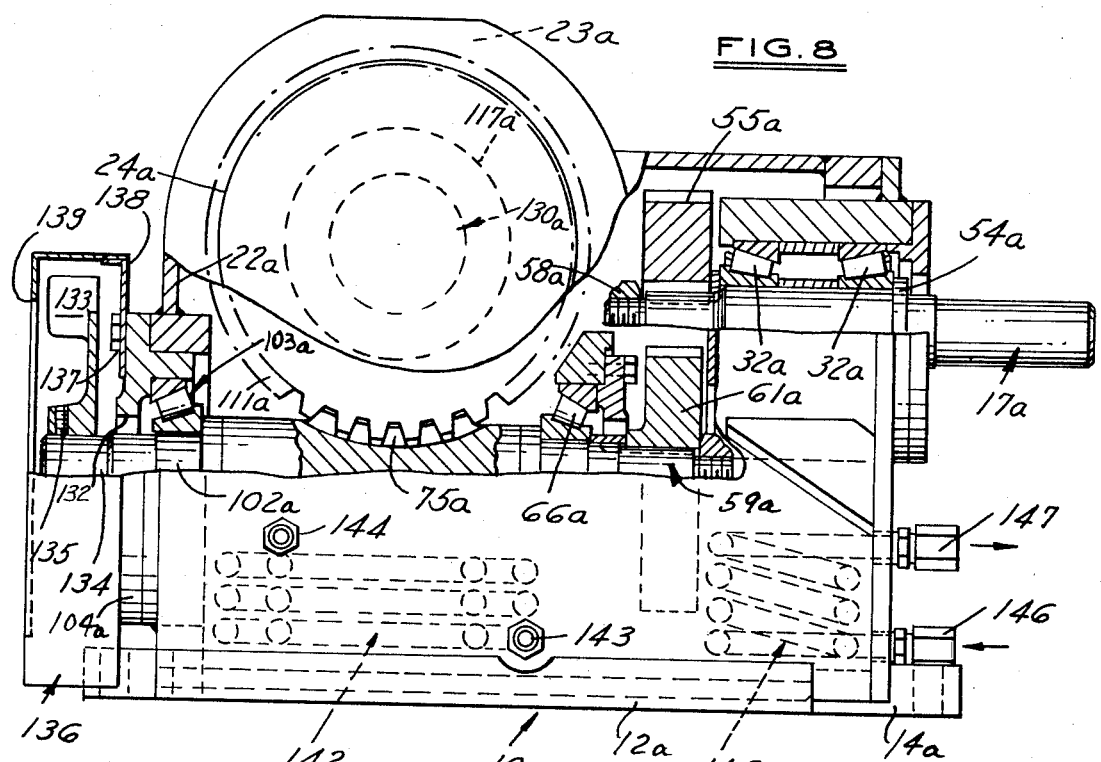
FIG. 8
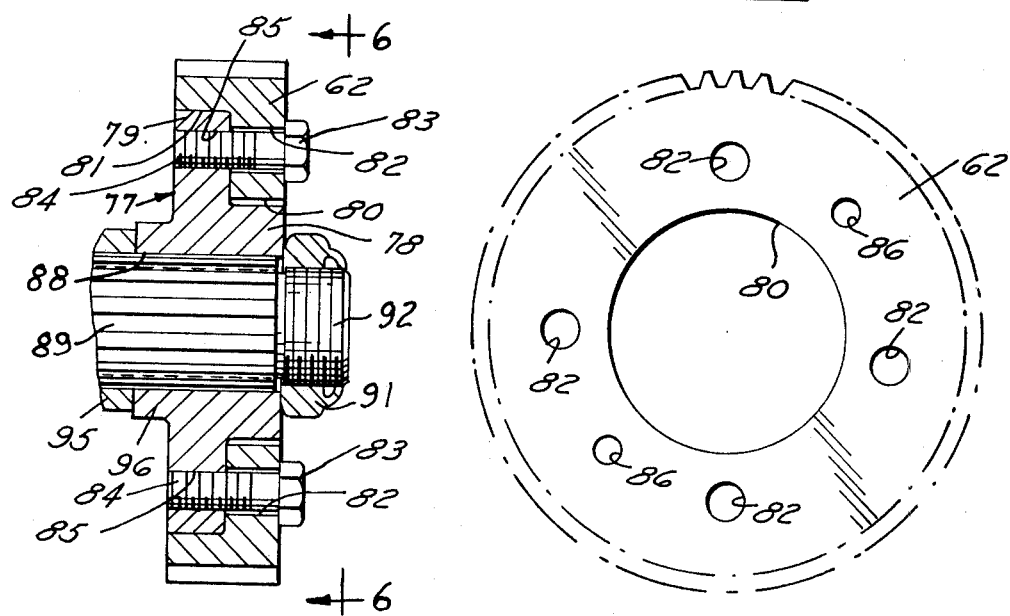
FIG. 5
FIG. 6

GEAR REDUCER WITH TANDEM DRIVES TO THE OUTPUT

BACKGROUND OF THE INVENTION

1. Field of the Invention

This invention relates to gear reducers, and more particularly, to a cone drive, low clearance, high output speed reducer. The invention is specifically concerned with speed reducers for applications requiring unusually low profile, along with high horsepower and output torque capacity, such as applications in coal mining equipment wherein the requirements of coal mining are such as to call for the lowest possible profile in such equipment.

2. Description of the Prior Art

It is well known in the speed reducer art to employ means for transmitting power from a driving element to a driven element through a plurality of intermediate gear units, with each gear unit transmitting a portion of the power or taking a portion of the load. Examples of such prior art speed reducers are disclosed in U.S. Pat. Nos. 1,499,617, 2,014,138 and 3,338,109. A disadvantage of the aforecited prior art speed reducers is that they have a high profile in order to employ the necessary gearing to provide a high horsepower output. A further disadvantage of the prior art speed reducers is that they have not satisfactorily solved the problem of equally dividing or sharing the load between plural intermediate gear units. One prior art structure for solving the load sharing problem involves the use of specially designed torsionally resilient shafts, or some form of torsionally resilient coupling. Another prior art construction for this purpose includes a special rocker mechanism for producing relative movement between intermediate gears or elements to take up the slack or backlash between the gears. However, such previous constructions are complicated and expensive and are not durable or reliable for heavy loads.

SUMMARY OF THE INVENTION

In accordance with the present invention, the cone twin drive speed reducer utilizes one input shaft and two gear sets which concentrate and convey the combined torque into a single output shaft. The speed reducer is provided with internal structural provisions for equalizing or sharing the load between the two gear sets.

The input shaft is adapted to be operatively connected to a suitable electric drive motor. The input shaft drives a helical idler drive pinion which in turn drives a pair of meshing helical idler driven pinions. There is no ratio change between the drive and driven pinions. The input shaft and idler pinions are operatively mounted in a suitable housing in which is also mounted a pair of cone drive worms operatively mounted on suitable shafts supported in the housing. The cone drive worm shafts are mounted in the left and right side of the housing and are driven in synchronism, and they are in turn respectively meshed with a pair of gears that are fixedly mounted on an output shaft which is operatively mounted in the housing. The axis of rotation of the input shaft is parallel to the axes of rotation of the two worm shafts. The output shaft is disposed at right angles to the axis of rotation of the two worm shafts and can be selectively extended through either side of the housing.

The overall input torque applied to the input shaft results in a distribution of torque through the two worm shafts to the two gears on the output shaft, where it is recombined into the output shaft. A problem that is inherent in situations where power is split between two flow paths is in trying to get both halves of the drive unit to share the load. If the two gear sets are not equally loaded, that is, if one is slightly ahead of the other in terms of position, then it will take most, if not all of the load, and the other gear set will simply trail along. In order to overcome this problem of load sharing, the twin drive speed reducer of the present invention is provided with an adjustment means which is built into one of the helical idler driven pinions, and which allows this idler pinion to be rotated and locked in place with respect to its respective worm shaft on which it is mounted. The helical idler driven pinion adjustment means functions to insure that the two driven helical pinions are equally loaded up when their respective worms make contact with the gears on the output shaft, in order to get an optimum degree of distribution of loading between the two worm shafts. An adjustment feature or load sharing feature is provided by having one of the helical idler driven pinions bolted on a hub or spider, which is in turn splined to its respective worm shaft. The adjustable helical idler driven pinion is bolted to the hub in such a way that it is possible to rotate it with respect to the hub through a small angle. The rotation of the helical idler pinion relative to the hub is accomplished by having slotted or enlarged holes formed through the pinion to permit rotation of the pinion relative to the attachment bolts for fixedly attaching the idler pinion to the hub after the desired rotation adjustment.

The cone twin drive speed reducer of the present invention is particularly adapted for low profile applications, such as applications in the low profile mining industry. In one embodiment, the overall height of the speed reducer was about eighteen inches, as compared to the prior art speed reducers of approximately twenty-four inches in height, which are capable of producing the same torque and power. The speed reducer of the present invention may be provided with either an air cooling system or a water cooling system.

Other features and advantages of this invention will be apparent from the following detailed description, appended claims, and the accompanying drawings.

DESCRIPTION OF THE DRAWINGS

FIG. 2 is a partial elevation section view of the gear reducer structure illustrated in FIG. 1, taken substantially along the line 2—2 thereof, looking in the direction of the arrows, and also showing a portion of the right side of the gear reducer shown in FIG. 1.

FIG. 3 is a fragmentary, horizontal section view of the gear reducer structure illustrated in FIG. 1, taken along the line 3—3 thereof, and looking in the direction of the arrows.

FIG. 4 is a schematic plan view of the reduction gearing employed in the speed reducer illustrated in FIG. 1.

FIG. 5 is a fragmentary, enlarged, elevation section view of the helical gear structure illustrated in FIG. 4, taken along the line 5—5 thereof, and looking in the direction of the arrows.

FIG. 6 is a front elevation view of the helical gear illustrated in FIG. 5, taken along the line 6—6 thereof, and with the supporting spider structure removed.

FIG. 7 is a front elevation view of a second embodiment gear reducer made in accordance with the principles of the present invention, with parts removed and parts shown in section.

FIG. 8 is a fragmentary, elevation section view, with parts broken away and parts shown in section, of the second embodiment gear reducer illustrated in FIG. 7, taken substantially along the line 8—8 thereof, looking in the direction of the arrows, and showing a portion of the right side structure of the gear reducer shown in FIG. 7.

DESCRIPTION OF THE PREFERRED EMBODIMENTS

Figure 1:
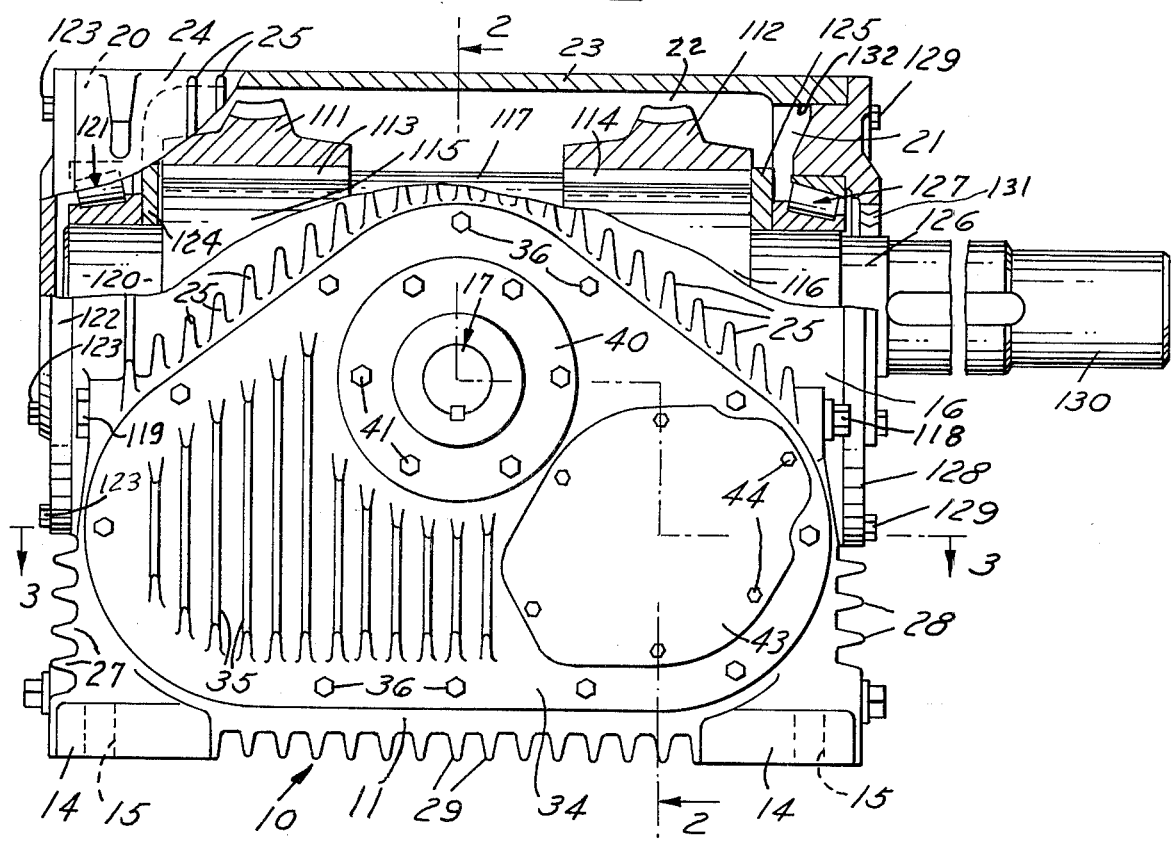
FIG. 1 is a front elevation view, with parts broken away and parts in section, of a gear reducer made in accordance with the principles of the present invention.

Referring now to the drawings, and in particular to FIGS. 1 and 2, the numeral 10 generally designates a cone twin drive speed reducer made in accordance with the principles of the present invention. The speed reducer 10 includes a suitable housing having a bottom wall 11 on which are integrally formed a pair of oppositely disposed mounting base flanges 12 and 14. The base flanges 12 and 14 are provided with suitable mounting bolt holes 13 and 15, for mounting the speed reducer in a desired location.

As shown in FIG. 2, the speed reducer housing includes a front wall 16 through which is operatively mounted an input shaft 17. As shown in FIGS. 1 and 3, the speed reducer housing includes a housing left side wall 20 and a right side wall 21. The numeral 22 designates the housing rear wall. The numeral 23 in FIG. 2 designates the housing top wall rear portion, and the numeral 24 designates the housing top wall front portion. As shown in FIG. 1, the top wall front portion 24 is provided with integral cooling fins 25. As shown in FIG. 2, the housing rear wall 22 is provided with cooling fins 26. As shown in FIG. 1, the left and right side walls 20 and 21 are provided on their outer surface with cooling fins 27 and 28. As shown in FIG. 1, the housing bottom wall 11 is also provided on its lower outer surface with cooling fins 29.

As shown in FIG. 2, the input shaft 17 is rotatably mounted by a pair of suitable roller bearing means, generally indicated by the numeral 32, in a journal member 33 that is operatively mounted in an opening 31 formed through the front wall 16. The journal member 33 is provided with a mounting flange 34 on its outer end, which is secured by suitable machine screws 36 and dowels 37 to the front wall 16 and housing top wall front portion 24. As shown in FIG. 1, the journal mounting flange 34 is provided on its outer surface with a plurality of integral cooling fins 35. As shown in FIGS. 1 and 2, the input shaft 17 extends outwardly of the journal member 33 and through a suitable retainer plate 40 which operatively supports a wiper seal 39 that is mounted around the input shaft 17, and which is in operative engagement therewith. The retainer plate 40 is secured in place on the outer face of the journal flange 34 by suitable machine screws 41. As shown in FIG. 2, an opening 42 is formed through the journal flange 34, and it is enclosed by a suitable cover plate 43 that is secured in place by suitable machine screws 44 (FIG. 1).

As shown in FIG. 2, the speed reducer 10 is provided with an air cooling system which includes a single cooling fan 47 that is provided with a hub 48. The hub 48 is operatively mounted by a set screw 49 on the input shaft 17, in a position spaced outwardly from the retainer cover 40. The fan 47 is enclosed by a suitable shield or hood 50, which encircles the fan 47. The hood 50 has a top portion and integral side portions, but it is open at its inner end so as to direct a flow of air over the front, sides and top wall portions of the speed reducer housing, and over the aforementioned cooling fins 25 through 29. The input shaft 17 extends outwardly through an opening 46 formed through a front integral wall portion of the fan hood 50. The fan hood 50 is secured on its two sides to the left and right walls of the speed reducer housing by suitable machine screws 51. The fan hood front wall is provided at each of the lower corners therof with a suitable lug 52 which is secured by a suitable machine screw 53 to the base flange 14.

As shown in FIG. 2, the input shaft 17 is provided with an enlarged diameter shoulder 54 which abuts the outer side of the cup of the outer bearing means 32. The inner side of the cup of the inner bearing means 32 is seated against a suitable spacer washer 57. A helical idler drive pinion or gear 55 is fixed by a suitable key 56 on the inner end of the input shaft 17. The idler pinion 55 is retained on the input shaft 17 by a suitable lock nut 58.

As best seen in FIG. 4, the idler drive pinion 55 meshes with and drives a pair of laterally spaced apart helical idler driven pinions 61 and 62. The idler driven pinions 61 and 62 are operatively mounted on a pair of laterally spaced apart worm drive shafts, generally indicated by the numerals 59 and 60, respectively. As shown in FIG. 3, the outer end of the worm shaft 59 is provided with a splined portion 64 which is operatively mounted in a splined bore 63 formed axially through the idler driven pinion 61. The worm shaft 59 further includes an enlarged diameter shoulder 65 which is adjacent the splined shaft end portion 64, and which is rotatably mounted in a suitable roller bearing means, generally indicated by the numeral 66. The roller bearing means 66 is operatively mounted in a bore 67 which is formed through an internal transverse vertical wall 68. The roller bearing means 66 is retained in place in the bore 67 by a suitable bearing retainer ring 69 which is secured in place by a plurality of suitable machine screws 70.

The outer end of the worm shaft 59 has a reduced diameter threaded portion 71, on which is operatively mounted a suitable lock nut 74. The idler driven pinion 61 is provided with an integral inwardly extended hub 73, which seats against one end of a metal spacer sleeve 72. The inner end of the spacer sleeve 72 is seated against the outer side of the bearing cup of the bearing means 66. The inner side of the cup of the bearing means 66 sits against a shoulder formed on the outer side of an enlarged diameter portion 76 on the worm shaft 59. A cone drive worm 75 is integrally formed on the worm shaft 59, in a position inwardly of the shoulder 76.

The idler driven pinion 62 is adjustably mounted on the worm shaft 60 by the following described structure. As shown in FIGS. 3 and 5, the idler driven pinion 62 is adjustably mounted on a hub or spider which is generally indicated by the numeral 77.

The spider 77 is provided with an outer annular shoulder 78 and an integral inwardly positioned annular pilot or flange 79. As best seen in FIG. 5, the idler driven pinion 62 is provided with a stepped axial bore which includes an outer axial bore 80 that terminates at its inner end at a larger diameter annular recess 81. The diameter of the annular recess 81 is made to a close tolerance relative to the outer periphery of the annular spider pilot 79 for rotation thereabout for adjustment purposes. The axial bore 80 is made to a slightly larger diameter than the outer diameter of the spider shoulder 78 to provide a slight clearance. The spider pilot 79 is provided with a plurality of evenly spaced, annularly disposed threaded holes 85 which are each adapted to communicate with a bore or slot 82 in the pinion 62. The bores 82 are of a larger diameter than the threaded holes 85.

The pinion 62 is secured to the spider 77 by a plurality of bolts 83, which in the illustrative embodiment, comprise a total of four bolts. As shown in FIG. 5, the threaded bodies 84 of the bolts 83 extend through the enlarged bores 82 into threaded engagement in the individual threaded holes 85 in the spider pilot 79. The bores 82 are made to a size larger than the diameter of the threaded end 84 of the bolts 83. For example, if a half inch bolt is employed for the bolts 83, then the bores 82 are made to a larger diameter, as for example, to a five-eighths inch diameter. It will be understood that the bores 82 may also be elongated to form slots in an annular direction, so as to permit rotational adjustment of the pinion 62 relative to the spider 77. The pinion 62 is set to a desired adjusted position as described in detail hereinafter. Briefly, the pinion 62 is adjusted to the desired position relative to the spider 77, and the bolts 83 are tightened. A pair of dowel holes 86 are then drilled and reamed through the pinion 62. Simultaneously, a pair of dowel holes 87 are formed through the attached pilot 79 of the spider 77. As shown in FIG. 3, a suitable dowel pin 93 is operatively mounted in each of the pair of aligned dowel holes 86 and 87. It will be seen that the dowel pins 93 function to carry the rotational torque between the pinion 62 and the spider 77, while the bolts 83 apply clamping pressure only to clamp the pinion 62 to the spider 77.

The adjusting of the pinion 62 relative to the spider 77 can be repeated after use of the speed reducer to take up any wear, in the manner described more fully hereinafter.

As shown in FIGS. 3 and 5, the outer end of the worm shaft 60 is provided with a splined portion 89 which is operatively mounted in a splined bore 88 formed axially through the spider 77. The worm shaft 60 further includes an enlarged diameter shoulder 90 (FIG. 3) which is adjacent the splined shaft end portion 89, and which is rotatably mounted in a suitable roller bearing means, generally indicated by the numeral 94. The roller bearing 94 is operatively mounted in a bore 100, which is formed through the internal transverse vertical wall 68. The roller bearing means 94 is retained in place in the bore 100 by a suitable bearing retainer ring 97, which is secured in place by a plurality of suitable machine screws 98.

As shown in FIG. 3, the outer end of the worm shaft 60 has a reduced diameter threaded portion 92, on which is operatively mounted a suitable lock nut 91. The idler driven pinion 62 is provided with an integral, inwardly extended hub or shoulder 96, which seats against one end of a metal spacer sleeve 95. The inner end of the spacer sleeve 95 is seated against the outer side of the bearing cup of the bearing means 94. The inner side of the cup of the bearing means 94 sits against a shoulder formed on the outer side of an enlarged diameter portion 101 on the worm shaft 60. A cone drive worm 99 is integrally formed on the worm shaft 60, in a position inwardly of the shoulder 101.

As shown in FIG. 2, the rear end 102 of the worm shaft 60 is rotatably supported by a suitable roller bearing means, generally indicated by the numeral 103. The bearing means 103 is operatively supported by a suitable bearing retainer member 104 which is operatively mounted in an opening 105 in the housing rear wall 22. The bearing retainer member 104 is secured in position by suitable machine screws 106.

The lower interior portion of the speed reducer housing forms a reservoir for lubricating oil. The numeral 107 in FIG. 2 designates a reservoir drain plug. The numeral 108 designates a reservoir fill inlet plug. The numeral 118 in FIG. 1 also designates a plug for a reservoir port plug. The numeral 119 in FIG. 1 designates a fitting for a reservoir oil level indicator.

The cone drive worms 75 and 99 are meshed with the cone gears 111 and 112, respectively. As shown in FIG. 1, the cone gears 111 and 112 are integrally formed on the hubs 115 and 116, and they are fixed to the output shaft 130 by suitable keys 113 and 114. The inner sides of the gear hubs 115 and 116 seat against the shoulders formed by the enlarged diameter central shaft portion 117 on the output shaft 130. The ratio between the worm 75 and the worm gear 111 is the same as the ratio between the worm 99 and the worm gear 112.

As shown in FIG. 1, the output shaft inner end 120 is rotatably supported by a suitable roller bearing means, generally indicated by the numeral 121. The roller bearing means 121 is operatively supported by a suitable bearing retainer plate 122 which is secured in place to the housing side wall 20 by suitable machine screws 123. A suitable spacer washer 124 is seated between the outer side of the cone gear hub 115 and the adjacent inner end of the cup of the bearing means 121. A similar spacer washer 125 is seated between the outer side of the cone gear 116 and the adjacent inner end of the cup of a roller bearing means, generally indicated by the numeral 127. The roller bearing means 127 operatively supports the front end of the output shaft 130. The bearing means 127 is operatively supported by a suitable bearing retainer plate 128 which is mounted in an opening 132 in the housing wall 21, and secured to the housing wall 21 by a plurality of suitable machine screws 129. The bearing retainer plate 128 carries a suitable wiper seal 131 which is operatively mounted around the shoulder 126 formed on the putput shaft 130.

FIGS. 7 and 8 illustrate a second embodiment of the invention, and the parts of this embodiment which are the same as the parts of the embodiment of FIGS. 1 through 6, have been marked with the same reference numerals followed by the small letter "a". The embodiment of FIGS. 7 and 8 illustrate the provision of a modified type of air cooling means, as well as a water cooling means. It will be understood that the water cooling means could be used separately, as well as in combination with the air cooling means.

As shown in FIG. 8, a fan 133 is mounted on a shaft extension 134 of the worm shaft 59a by a suitable set screw 135. A similar fan 133 is also mounted on the other worm shaft 60a (not shown). A fan hood or shroud, generally indicated by the numeral 136, is mounted around the pair of fans 133 for directing the flow of air inwardly over the speed reducer housing. The shroud 136 may be attached to the housing by any suitable means, as by a plurality of attachment straps 138 which are attached to the bearing retainer members 104a by suitable machine screws 137. An inlet opening 139 is formed in the outer end wall of the hood 136.

A pair of coolant coils 142 and 145 are mounted in the lower end of the speed reducer housing for cooling the lubricating fluid in the housing reservoir. The coolant coil 142 is provided with an inlet fitting 143 and an outlet fitting 144. The coolant coil 145 is provided with an inlet fitting 146 and an outlet fitting 147. It will be understood that the inlet fittings 143 and 146 would be connected to a suitable source of coolant, as for example, a source of cooled water.

Figure 9:
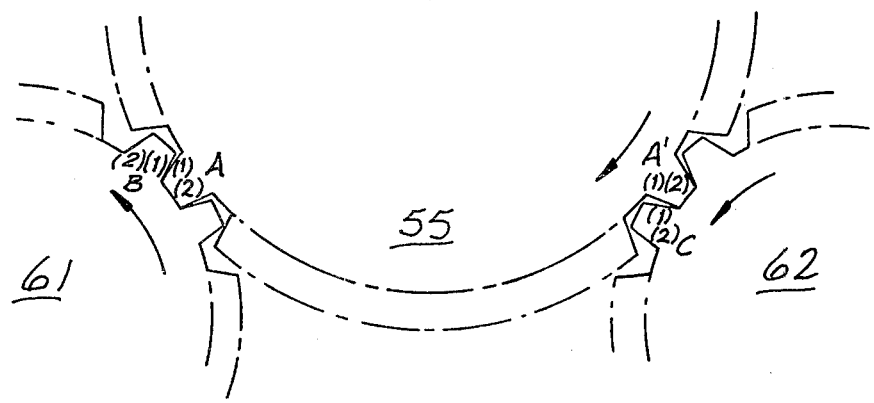
FIG. 9 is an exaggerated view showing simultaneous teeth contact of the idler driving pinion and the idler driven pinions.

In use, the idler driven pinion 62 would be adjusted to achieve load sharing between the gear sets by the following procedure. The output shaft 130 would be locked in a stationary position by any suitable means. For example, a suitable clamp means could be provided to clamp the output end of the shaft 130 in a stationary position. The input shaft 17 is then turned clockwise to bring the worm threads of worm 75 into contact with the gear teeth of gear 111, as shown in FIG. 4 and FIG. 7. That is the input shaft 17 is turned until the teeth of idler drive pinion 55 and idler driven pinion 61 and the teeth of worm 75 and gear 111 are all in simultaneous contact. FIG. 7 and FIG. 9 show in an exaggerated view of tooth A on an idler drive pinion 55 having a driving face designated as (1) and a non-driving face designated as (2). The driving face (1) of tooth A is in direct contact with the driven face (1) of driven tooth B on idler driven pinion 61. Then the input shaft is clamped in a stationary position by any suitable apparatus.

As shown in FIG. 2 and FIG. 5, with the four bolts 83 released or loose, the spider 77 and the right side cone drive worm 99 are turned counterclockwise as viewed in FIG. 4 and FIG. 7 to the worm threads 99 are moved into contact with gear teeth 112. The idler helical pinion 62 then is turned clockwise or in the opposite direction as the rotation of the worm 99 to bring the gear teeth of idler driven pinion 62 shown in FIG. 3 into contact with the idler driving pinion teeth 55. FIG. 7 and FIG. 9 show in an exaggerated view tooth A on idler drive pinion 55 having a driving face designated as (1) and a non-driving face designated as (2). The driving face (1) of tooth A' is in direct contact with the driven face (1) of driven tooth C on idler driven pinion 62. The idler driven pinion 62 is held in this preloaded position and tightened to the spider 77 by the four bolts 83. The means for holding the input shaft 17 is then removed and the lock nut 91 is removed from the right side worm shaft 60. Punch pricks or marks are then made on one of the ends of the splines on shaft end 89 and its mating space on the helical gear spider 77 for location purposes. The adjustable helical gear 62, together with its spider 77 which is bolted to gear 62, is then removed as a unit from the splined shaft 89. The dowel holes 86 and 87 are then drilled and reamed through the pinion 62 and spider 77, respectively. The pair of dowel pins 93 are then pressed into the pairs of mating drill holes 86 and 87 for locking the helical idler drive pinion 62 to the spider 77. Safety wires are then used to connect the bolts 83 together. The assembly of the pinion 62 and the spider 77 is then reinstalled on the right side worm shaft 60 and the aforedescribed punch marks matched. The lock nut 91 is reinstalled and the means for holding the output shaft 130 is removed. The last described procedure for adjusting the pinion 62 relative to the spider 77 may be employed after the speed reducer has been used to take up any unequal load distribution that may have developed through a period of use.

The twin drive cone reducer of the present invention is especially adapted for low profile equipment applications, as for example, the requirements of low profile equipment for coal mining. The speed reducer 10 is constructed and arranged to take advantage of the strength of two individually smaller units and combine them into one output, and thereby provide a resultant torque and power equal to a speed reducer that normally would be higher in profile. The principle of operation of the speed reducer 10 includes a single input shaft 17 which is adapted to be driven by any suitable electric drive motor. The input shaft 17 drives the helical idler drive pinion 55, as shown in FIG. 4. The drive pinion 55 drives and meshes with the left hand helical idler driven pinion 61 and the right hand idler driven pinion 62. The pinions 61 and 62 are operatively mounted on the left and right hand worm shafts 59 and 60, respectively. The pinions 61 and 62 are at a one-to-one ratio with the drive pinion 55. The worm shafts 59 and 60 are provided with worms 75 and 99, respectively, which mesh with and drive the pair of worm gears 111 and 112. It will be understood that other ratios may be used between the drive pinion 55 and the driven pinions 61 and 62. For example, a ratio of 1½ to 1, 2 to 1, and up. It will be understood that the ratio between one cone gear set would have to be the same for the other cone gear set.

It will thus be seen that the overall input torque supplied to the input shaft 17 results in a distribution of the torque through the two worms 75 and 99, and then to the two gears 111 and 112, and then it is recombined into one output shaft 130. Experience has shown that one of the advantageous features of the speed reducer 10 is that if one gear unit is loaded more heavily than the other, there is a tendency for it to wear because it is running at a higher load. However, this reduces the load on that gear unit, thereby providing a sharing between the two gear units of the speed reducer 10. This feature is advantageous because the load sharing function tends to improve as the speed reducer is used, whereas the prior art devices tend to lose their load sharing ability with extensive use.

While it will be apparent that the preferred embodiments of the invention herein disclosed are well calculated to fulfill the objects above stated, it will be appreciated that the invention is susceptible to modification, variation and change.

That is, the invention disclosed describes that with the output shaft rotation to be in a counterclockwise direction coincident with a clockwise direction of the input shaft, tooth contact on the idler drive pinion and both idler driven pinions will be simultaneously coincident with drive tooth faces marked (1), as shown in FIG. 9. Conversely, with a clockwise output shaft direction and a coincident counterclockwise direction of the input shaft, tooth contact on the idler drive pinion and both idler driven pinions will be simultaneously coincident with drive tooth faces marked (2). To reverse the direction of the shaft the process must be redone; that is, the spider must be loosened and idler drive pinion 62 moved in the reverse direction in order that the teeth on the idler drive pinion and both idler driven pinions are in simultaneous contact. This procedure insures that the driven tooth faces on both idler driven pinions are in simultaneous mesh or contact with the driving tooth faces, or same sides of the teeth, on the idler drive pinion, such as shown in FIG. 7 and FIG. 9. That is, the reverse is true only after the adjustment is made; the whole sequence must be reversed to take up the backlash in order to equalize load sharing in the other direction.

What is claimed is:

1. In a speed reducer, the combination, comprising:
   (a) a housing;
   (b) an input shaft rotatably mounted in said housing in a horizontal plane;
   (c) an idler drive pinion operatively mounted on said input shaft;
   (d) a pair of laterally spaced apart worm shafts rotatably mounted in said housing in positions parallel to each other and parallel to said input shaft;
   (e) an idler driven pinion operatively mounted on each of said worm shafts and meshed with and driven by said idler drive pinion;
   (f) an output shaft rotatably mounted in said housing in said horizontal plane;
   (g) a pair of worm gear sets including a pair of worm gears operatively mounted on said output shaft, and a worm on each of said worm shafts; and
   (h) load sharing means for obtaining equal load distribution between the idler pinion and driven pinions and the worms and worm gears of said pair of worm gear sets, said load sharing means comprising:
      (1) means for adjustably mounting one of said idler driven pinions on one of said worm shafts;
      (2) each tooth on said idler drive pinion having a drive face and a non-driving face;
      (3) each tooth on each of said idler driven pinions having a drive face and a non-driving face;
   whereby said driving face of said teeth of the idler driving pinion are in simultaneous contact with the driving face of said teeth of both idler driven pinions.

2. A speed reducer as defined in claim 1, wherein said means for adjustably mounting one of said idler driven pinions on one of said worm shafts includes:
   (a) a spider member fixedly mounted on said one of said worm shafts;
   (b) means for adjustably securing said one of said idler driven pinions on said spider member for rotatable adjustment on said spider member; and,
   (c) means for retaining against rotation relative to said spider member said one idler driven pinion on said one of said worm shafts after said one idler driven pinion has been rotatably adjusted to take up said backlash for sharing the load transmitted between the input shaft and the output shaft by said pinions, worm shafts and worm gear sets.

3. A speed reducer as defined in claim 2, wherein:
   (a) said means for adjustably securing said idler driven pinion on said spider member comprises a plurality of bolts which are mounted through enlarged openings formed through said last mentioned pinion and which are threadably engaged in threaded bores in said spider member.

4. A speed reducer as defined in claim 3, wherein:
   (a) said means for retaining said one idler driven pinion against rotation relative to said spider member comprises at least one dowel pin operatively mounted through dowel holes formed through said last mentioned pinion and spider member.

5. A speed reducer as defined in claim 4, wherein:
   (a) said idler pinions comprise helical gears.

6. A speed reducer as defined in claim 4, wherein:
   (a) the gear ratios between said idler drive pinions and idler driven pinions is the same; and
   (b) the gear ratios between the worm and the worm gears of each said worm gear sets is the same.

* * * * *